(12) United States Patent
Schreiner et al.

(10) Patent No.: US 10,120,408 B2
(45) Date of Patent: Nov. 6, 2018

(54) EVENT CONTROLLED CLOCK SWITCHING

(71) Applicant: TEXAS INSTRUMENTS INCORPORATED, Dallas, TX (US)

(72) Inventors: Joerg Harald Hans Jochen Schreiner, Fuerstenfeldbruck (DE); Marcus Herzog, Finsing (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/870,396

(22) Filed: Sep. 30, 2015

(65) Prior Publication Data

US 2017/0090536 A1  Mar. 30, 2017

(51) Int. Cl.
*G06F 1/04* (2006.01)
*G06F 1/08* (2006.01)

(52) U.S. Cl.
CPC ..................................... *G06F 1/08* (2013.01)

(58) Field of Classification Search
None
See application file for complete search history.

(56) References Cited

U.S. PATENT DOCUMENTS

| 5,774,703 A * | 6/1998 | Weiss | G06F 1/08 713/501 |
| 6,975,154 B1 * | 12/2005 | Pedersen | G06F 1/10 327/293 |
| 2005/0005183 A1 * | 1/2005 | Nobunaga | G11C 7/1027 713/401 |
| 2010/0235672 A1 * | 9/2010 | Zhang | G06F 1/12 713/400 |
| 2013/0147526 A1 * | 6/2013 | Kim | H03K 21/00 327/115 |
| 2014/0063264 A1 * | 3/2014 | Weinberg | H04N 19/42 348/180 |
| 2015/0073497 A1 * | 3/2015 | Gordon | A61N 1/37264 607/59 |

\* cited by examiner

*Primary Examiner* — Fahmida Rahman
(74) *Attorney, Agent, or Firm* — Kenneth Liu; Charles A. Brill; Frank D. Cimino

(57) ABSTRACT

A system and method for controlling clock generation. A system includes a processor configured to execute instructions retrieved from memory, and a clock generation system coupled to the processor. The clock generation system is configured to generate a clock signal that the processor applies to execute the instructions. The clock generation system includes a plurality of configuration registers and selection circuitry. Each of the configuration registers includes fields that control a frequency of the clock signal. The selection circuitry selects which of the plurality of configuration registers determines the frequency at a given time.

20 Claims, 3 Drawing Sheets

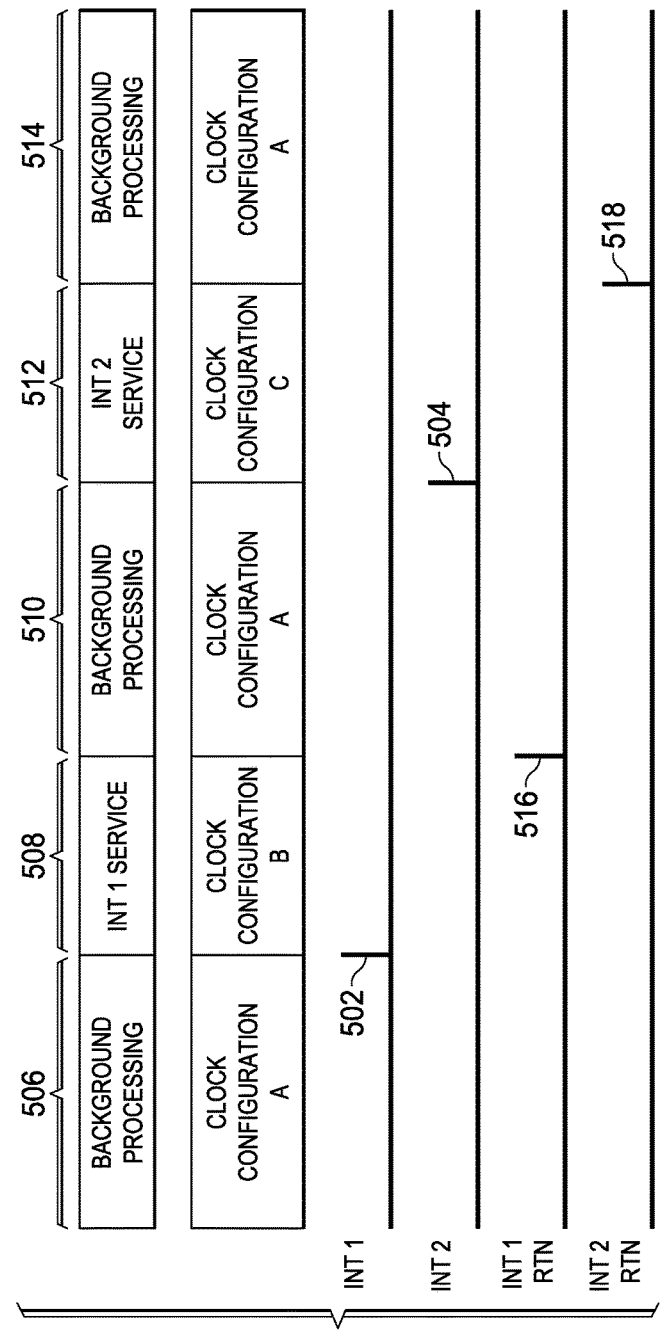

EVENT CONTROLLED CLOCK SWITCHING

BACKGROUND

In many embedded processor applications, energy consumption is a primary concern. For example, in some battery powered applications, the working life of a device is tied to the life of a primary cell powering the device. Energy consumption of an embedded processor can be a major factor in the life of the primary cell and in turn, in the life of the device. Processor energy consumption may depend, to a large extent, on the frequency at which the processor operates and the number of instructions that must be executed.

SUMMARY

A system and method for controlling clock generation in an electronic device are disclosed herein. Changes in clock frequency are performed automatically by a clock generator based on events detected by the clock generator without execution of software instructions. In one embodiment, a system includes a processor configured to execute instructions retrieved from memory, and a clock generation system coupled to the processor. The clock generation system is configured to generate a clock signal that the processor applies to execute the instructions. The clock generation system includes a plurality of configuration registers and selection circuitry. Each of the configuration registers includes fields that control a frequency of the clock signal. The selection circuitry selects which of the plurality of configuration registers determines the frequency at a given time.

In another embodiment, a microcontroller includes an instruction memory, a processor core configured to execute instructions retrieved from the instruction memory; and a clock generator. The clock generator is configured to provide a clock signal to the processor core, and to select a frequency for the clock signal, from a plurality of predefined frequencies, responsive to detection of one of a plurality of events. Each of the events corresponds to one of the frequencies.

In a further embodiment, a method for clock selection includes assigning values to fields of each of a plurality of configuration registers of a clock generator. Each of the configuration registers specifies parameters of the clock generator that control an output frequency of the clock generator. One of a plurality of different events occurring in a microcontroller is selectively associated with each of the configuration registers. Occurrence of each of the different events is detected. Values stored in the fields of one of the configuration registers are routed to clock control circuitry of the clock generator responsive to detection of one of the events associated with the one of the configuration registers. A clock signal is generated based on the values assigned to the fields of the one of the configuration registers.

BRIEF DESCRIPTION OF THE DRAWINGS

For a detailed description of various examples, reference will now be made to the accompanying drawings in which:

FIG. 4 shows a configuration register for use in a clock generator that includes event-based clock control in accordance with various embodiments;

FIG. 5 shows an example of event-based clock control in accordance with various embodiments.

NOTATION AND NOMENCLATURE

Figure 1:
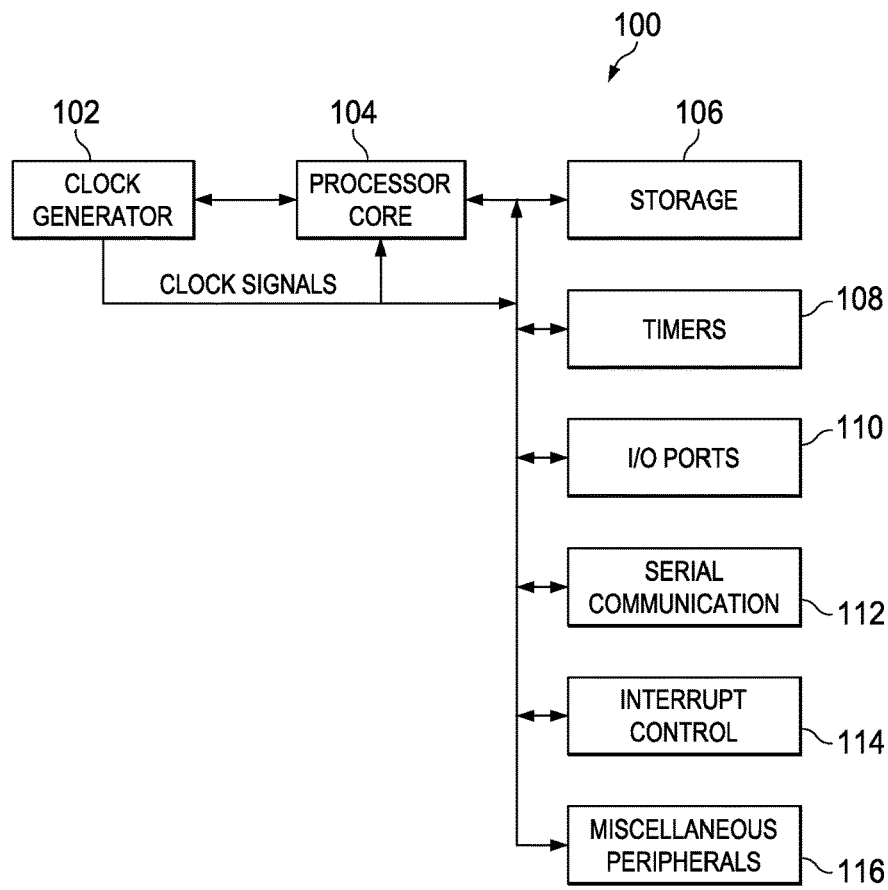
FIG. 1 shows a block diagram for a microcontroller that includes event-based clock control in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Because processor energy consumption may be closely related to the clock frequency applied to the processor and the number of instructions executed by the processor, clock frequency and instruction count should be minimized if processor energy consumption is to be minimized. Because the timing requirements of the tasks executed by a processor may vary, processors may provide programmable clock systems that allow the clock frequency to be varied under program control. Instructions executed by the processor can reconfigure the clock system to generate clock signals at a frequency suitable for execution of a specific task while reducing energy consumption. Unfortunately, software control of clock frequency increases processor instruction count, which tends to increase processor energy consumption.

Additionally, in applications powered via energy harvesting, when an event occurs that requires processing, the clock system must be reconfigured as quickly as possible to minimize the energy devoted to reconfiguration and to maximize the energy available for use by the processing task. For example, if too much energy is consumed by clock system reconfiguration, then completion of the processing task may be jeopardized due to lack of sufficient energy.

Similarly, processor operation with a suboptimal clock configuration may waste energy and jeopardize task completion.

Embodiments of the clock control system disclosed herein include a plurality of clock system configuration registers and configuration selection logic that automatically reconfigures the clock system of a processor responsive to detection of an event internal or external to the processor. Such events may include internally or externally generated interrupts, signals levels or transitions occurring at a terminal of the processor, software initiated mode changes, or other signals present in the processor. By reconfiguring the clock system without software intervention, embodiments of the clock control system disclosed herein reduce the overall energy consumption of the clock system and the processor or other device utilizing the clock system.

FIG. 1 shows a block diagram for a microcontroller 100 in accordance with various embodiments. The microcontroller 100 includes a clock generator 102, a processor core 104, storage 106, timers 108, input/output (I/O) ports 110, serial communication logic 112, interrupt control 114, and miscellaneous peripherals 116. The processor core 104 includes a central processing unit (CPU) that executes instructions to perform various arithmetic operations, logical operation, program flow control operations, etc. The processor core 104 may include a number of sequentially arranged function units that form an execution pipeline. For example the processor core 104 may include a fetch unit that retrieves instructions from memory for execution, a decode unit that decodes the instructions retrieved by the fetch unit and provides control signals that direct the execution of the instruction, and an arithmetic logic unit (ALU) that performs arithmetic and/or logic operations specified by the decoded instruction. The processor core 104 may also include registers that store operands for use by the execution pipeline. For example, an instruction fetched by the fetch unit and decoded by the decode unit may direct two operands stored in two registers to be routed to the ALU, direct the ALU to sum the two operands, and direct the sum to be routed to and stored in a third register.

The storage 106 may include volatile and/or non-volatile memory for storage of instructions and/or data used by the processor core 104. Examples of volatile memory include static and dynamic random access memory (RAM). Examples of non-volatile memory include read-only-memory, FLASH memory, ferro-electric RAM, and other types of memory that retain data after power is removed. The processor core 104 accesses the instructions and data stored in the storage 106 to perform programmed operations.

The timers 108 may include various counters, registers, comparators, and/or other timing circuits that measure time or generate timing signals. The timing circuits may be programed, by the processor core 104, to measure the time between various signal transitions, to generate timing signals of a specified period, etc. Outputs of the timing circuits may be provided to the interrupt controller 114 to interrupt the processor core 104. For example, the processor core 104 may program the timers 108 to generate a signal at a given time period (e.g., 1 millisecond (ms) period) and provide the signal to the interrupt controller 114 so that the processor core 104 is interrupted to perform specific processing at a 1 ms interval.

The I/O ports 110 include circuitry that drives signals out of access terminals of the microcontroller 100 and circuitry that detects signals externally driven onto access terminals of the microcontroller 100. The circuitry may include registers that can be read and/or written by the processor core 104, line driver circuits, etc. The I/O ports 110 may generate signals that are provided to the interrupt controller 114 to interrupt the processor core 104. For example, the I/O ports 110 may detect a signal transition on a terminal of the microcontroller 100 and generate a signal that is provided to interrupt controller 114 to interrupt the processor core 104. In some embodiments, the signals generated or detected by the I/O ports 110 may trigger various other operations in the microcontroller 100.

The serial communication logic 112 includes adapters that provide serial communication services to the processor core 104. The adapters may include universal asynchronous receiver transmitters (UARTs), various types of synchronous serial interface adapters (e.g., serial peripheral interface adapter, inter-integrated circuit adapter), Universal Serial Bus (USB) adapters, and other serial communication interface adapters. The serial communication logic 112 may generate signals that are routed to the interrupt controller 114 to interrupt the processor core 104 on receipt of one or more data values, on detection of an error in communication, on a queue levels falling below or rising above a specified level, etc.

The interrupt controller 114 receives signals generated within the microcontroller 100, and signals generated external to the microcontroller 100, and produces interrupt signals that cause the processor core 104 to execute a set of instructions that provide services related to the cause of the interrupt signal assertion (i.e., an interrupt service routine). The interrupt signals generated by the interrupt controller 114 may include information that identifies the cause of an interrupt. Because multiple signals provided to the interrupt controller 114 may cause assertion of the interrupt signal, the interrupt controller 114 may be programmed by the processor core 104 to enable and disable assertion of the interrupt signal based on each signal received by the interrupt controller 114, to assign priority values to each signal received by the interrupt controller, to enable and disable generation of the interrupt signal, etc.

The miscellaneous peripherals 116 may include any number of other peripheral devices and systems included in the microcontroller 100. For example, miscellaneous peripherals 116 may include a direct memory access controller, an analog-to-digital converter, a digital-to-analog converter, embedded debugging logic, signal processing logic, etc.

Timing signals generated in and/or used by the various microcontroller sub-systems, including the sub-systems described above, may be derived from clock signals produced by the clock generator 102. The clock generator 102 includes circuitry that generates clock signals, changes the frequency of the generated clock signals, and selects the various clock signals for use by the various subsystems of the microcontroller 100. For example, the clock generator 102 may include oscillator circuitry that generates a clock signal having a frequency based on a quartz, or other, crystal, a tank circuit, a resistor and capacitor, delay elements, or other frequency control components coupled to the oscillator circuitry. The clock generator 102 may also include counters and/or other frequency division circuitry that produce a frequency by dividing the clocks produced by an oscillator circuit. The clock generator 102 may further include selector circuitry that selects one or more of the various clock signals generated by the frequency division circuitry or the oscillator circuitry to provide to the subsystems of the microcontroller 100.

To reduce the energy consumed by changing of clock frequencies in the microcontroller 100, the clock generator 102 includes circuitry that automatically and without software intervention, responsive to occurrence and detection of an event in the microcontroller 100, such as an interrupt, a mode change, or completion of interrupt processing, changes the configuration of the oscillator circuitry, dividers, selectors, etc. of the clock generator 102 to produce clocks suitable for processing subsequent to the event.

Figure 2:
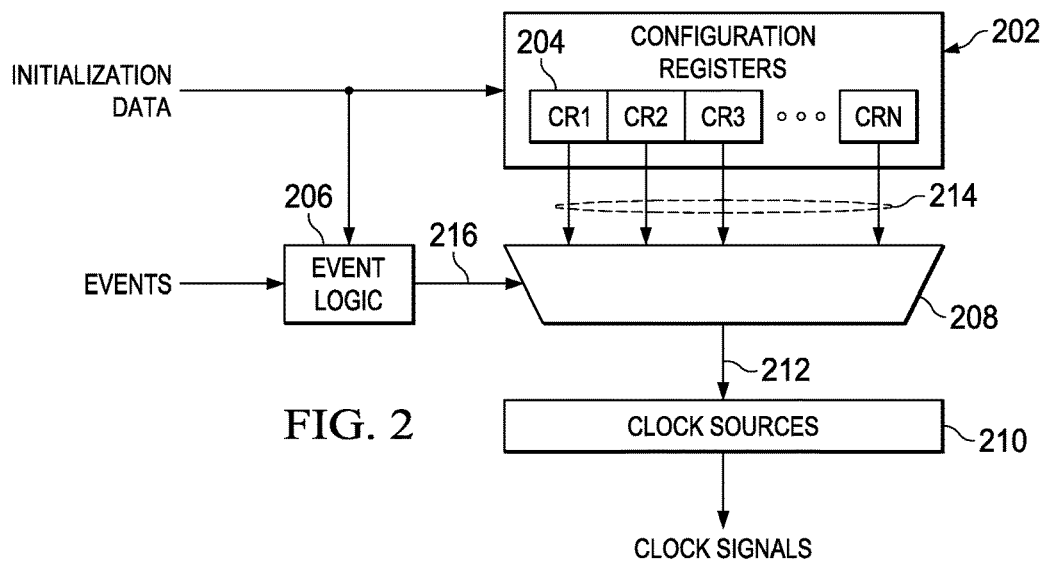
FIG. 2 shows a block diagram for a clock generator that includes event-based clock control in accordance with various embodiments.

FIG. 2 shows a block diagram for a clock generator 102 that includes event-based clock control in accordance with various embodiments. The clock generator 102 includes clock sources 210, configuration registers 202, event logic 206, and configuration selection logic 208. The clock sources 210 include the oscillator circuitry, dividers, clock selectors, and other circuitry that generates clock signals and selects clock signals to be provided to the subsystems of the microcontroller 100. The clock sources 210 are controlled by clock source control signals 212 routed to the clock sources 210 by the configuration selection logic 208. The clock source control signals 212 may enable or disable oscillator circuits of the clock sources 210, enable or disable, and set frequency division values in frequency dividers of the clock sources, and set the selectors of the clock sources 210 to select one or more clock signals for use by the subsystems of the microcontroller 100.

The configuration selection logic 208 selects the clock source control signals 212 from the control signals 214 provided by the configuration registers 202. The configuration registers 202 include a plurality of configuration registers 204. Each configuration register 204 provides a set of control signals 214, and each set of control signals 214 includes signals that can control the oscillator circuits, frequency dividers, and selectors of the clock sources 210. Accordingly, each of the configuration registers 204 provides information to set the clock sources 210 as needed to generate clock signals for use in the microcontroller 100. Each of the configuration registers 204 may store different clock control information, and therefore each of the configuration registers 204 may set the clock sources 210 to provide different output clock frequencies by enabling different oscillator circuits, setting different frequency divider values, and selecting different clock signals.

The clock control information stored in configuration registers 204 may be provided by the processor core 104. For example, the processor core 104 may execute an initialization routine stored in the storage 106 where the instructions of the initialization routine cause the processor core 104 to write initialization data to the configuration registers 204. The initialization data written to each of the configuration registers 204 may specify the signal values to be provided to the clock sources 210 on occurrence of a particular event.

The event logic 206 detects the occurrence of events in the microcontroller 100, and generates selector control signals 216 based on the detected events. The selector control signals 216 cause the configuration selection logic 208 to select one set of control signals 214 to apply to the clock sources 210. More specifically, the selector control signals 216 cause the configuration selection logic 208 to select the set of control signals 214 corresponding to a detected event to apply to the clock sources 210. Thus, detection of an event by the event logic 206 causes the clock generator 102 to automatically configure the clock sources 210 as needed to generate clock signals needed for processing subsequent to the event. For example, if the event is an interrupt request, then on detection of the interrupt request by the event logic 206, selector control signals 216 generated by the event logic 206 may cause the configuration selection logic 208 to route the control signals 214 provided by a control register 204 initialized to configure the clock sources 210 to generate clock signals to used by the microcontroller 100 to service the interrupt request. Similarly, if the event is a change in mode of the microcontroller 100 (e.g., a change in power mode, such as enabling a reduced power mode), then on detection of the event by the event logic 206, selector control signals 216 may cause the configuration selection logic 208 to route the control signals 214 provided by a control register 204 initialized to configure the clock sources 210 to generate clock signals to used by the microcontroller 100 while in the reduced power mode.

In some embodiments, the selector control signals 216 to be generated by the event logic 206 on detection of each event may be provided by the processor core 104. For example, the processor core 104 may execute an initialization program stored in the storage 106 where the instructions of the initialization program cause the processor core 104 to write selector initialization data to registers of the event logic 206. Event routing circuitry in the microcontroller 100 may route selected event signals to input ports of the event logic 206. Information provided to the event logic 206 by the processor core 104 may associate each input port of the event logic 206 with a set of selector control signals 216. In some embodiments, the event logic 206 may generate, for each detection of an event at an input port of the event logic 206, a predetermined value of the selector control signals 216.

Thus, after initialization, in the clock generator 102, detection of an event by the event logic 206 causes the clock generator 102 to be automatically reconfigured, without instruction execution by the processor core 104, to produce clock signals associated with the event. The clock generator 102 may support any number of events and any number of different clock generator configurations.

Figure 3:
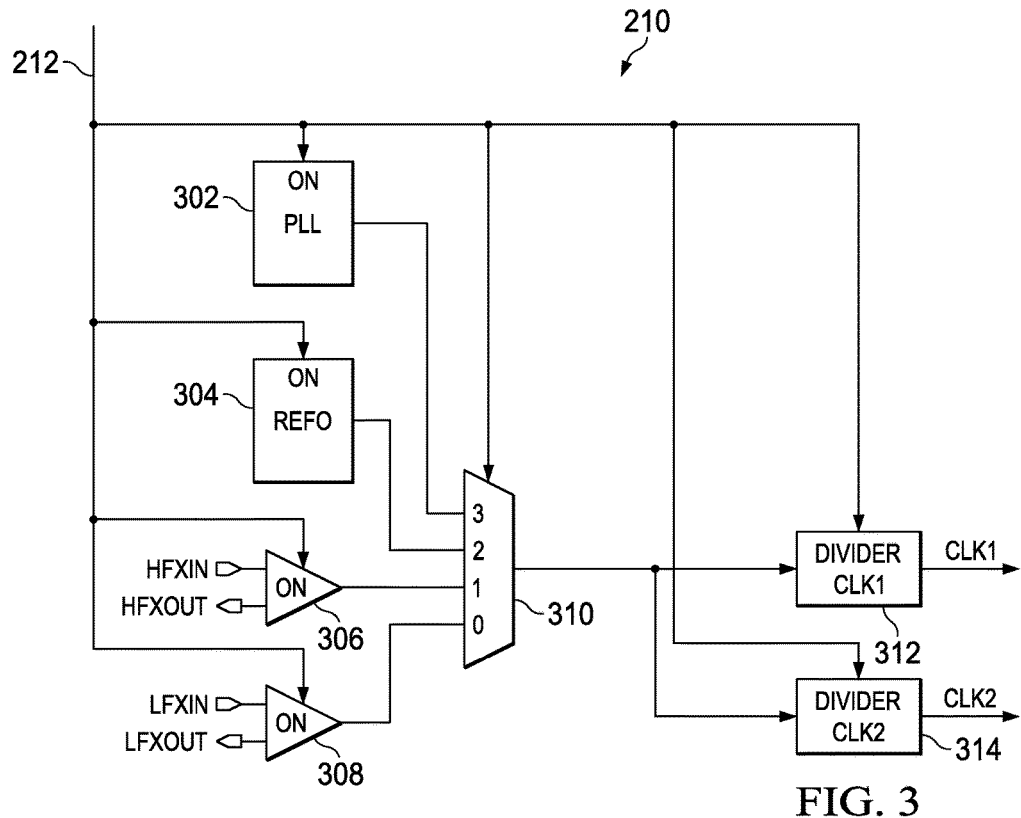
FIG. 3 shows a block diagram for clock source circuitry in accordance with various embodiments.

FIG. 3 shows a block diagram for clock sources circuitry 210 in accordance with various embodiments. The clock sources circuitry 212 includes a phase-locked loop (PLL) 302, a reference oscillator 304, a high-frequency oscillator 306, a low-frequency oscillator 308, a selector 310, and dividers 312 and 314. The high-frequency oscillator 306 and the low-frequency oscillator 308 may generate clock signals based on a quartz crystal or other frequency reference. The PLL 302 may multiply an input frequency. The reference oscillator 304 may generate a clock frequency based on delay elements or other reference frequency control elements. The selector 310 selects one of the PLL 302, the reference oscillator 304, the high-frequency oscillator 306, or the low-frequency oscillator 308 to clock the dividers 312 and 314. The dividers 312 and 314 generate clocks provided to the various subsystems of the microcontroller 100. Other embodiments of the clock sources 210 may include different components.

Each of the PLL 302, the reference oscillator 304, the high-frequency oscillator 306, the low-frequency oscillator 308, the selector 310, and the dividers 312 and 314 is controlled by the clock source control signals 212. The clock source control signals 212 may include enable/disable control for the PLL 302, the reference oscillator 304, the high-frequency oscillator 306, and the low-frequency oscillator 308, a divider values for the PLL and dividers 312 and 314, and a selection value for the selector 310. As explained above, each of the signal values of the clock source control signals 212 is generated in a configuration register 204. Other embodiments of the clock sources 210 may include different oscillators, frequency dividers/multipliers, and selectors, and clock source control signals 212 appropriate to the different clock sources 210 are provided by the configuration registers 204.

FIG. 4 shows a configuration register 204 for use in a clock generator 102 that includes event-based clock switching in accordance with various embodiments. The embodiment of the configuration register 204 shown in FIG. 4 includes fields directed to controlling the embodiment of the clock sources 210 shown in FIG. 3. Other embodiments of the configuration register 204 may include different fields to provide control of an embodiment of the clock sources 210. To control the clock sources 210 of FIG. 3, the register 204 includes a high-frequency oscillator enable field 402, a low-frequency oscillator enable field 404, a reference oscillator enable field 406, a PLL control field 408, a selector control field 410, a first divider value field 412 and a second divider value field 414.

The value stored in the high-frequency oscillator enable field 402 produces clock source control signals 212 that can enable or disable the high-frequency oscillator 306. The value stored in the low-frequency oscillator enable field 404 produces clock source control signals 212 that can enable or disable the low-frequency oscillator 308. The value stored in the reference oscillator enable field 406 produces clock source control signals 212 that can enable or disable the reference oscillator 304. The values stored in the PLL control field 408 produces clock source control signals 212 that can enable or disable the PLL 302 and set a divisor value in the PLL 302. The values stored in the selector control field 410 produces clock source control signals 212 that specify which of the PLL 302, the reference oscillator 304, the high-frequency oscillator 306, or the low-frequency oscillator 308 output is routed to the dividers 312 and 314. The values stored in the first divider value field 412 and a second divider value field 414 produces clock source control signals 212 that respectively specify the divisors applied in the divider 312 and the divider 314.

FIG. 5 shows an example of event-based clock control in the microcontroller 100 in accordance with various embodiments. In time interval 506, the microcontroller 100 is performing background processing and the clock generator 102 is applying clock configuration A to generate the clocks used by the microcontroller 100 to perform background processing. Clock configuration A may be defined, for example, by the values stored in a first of the configuration registers 204. At 502 an interrupt request (INT 1) is asserted in the microcontroller 100. The clock signals used process INT 1 may be different from those used for background processing. For example, a higher frequency clock may be needed to provide quick processing of INT 1. The event logic 205 detects the interrupt request and generates selector control signals 216 corresponding to assertion of INT 1. The selector control signals 216 cause the clock selection logic 208 to select control signals 214 assigned for processing of INT 1. The control signals assigned for processing of INT 1 may be defined as Clock configuration B, which may be specified by the values stored in a second of the configuration registers 204. The clock selection logic 208 routes the control signals 214 assigned for processing of INT 1 to the clock sources 210 via the clock source control signals 212, and the clock sources 210 are reconfigured using the clock source control signals 212 to provide the clock signals used to process the interrupt request, INT 1.

At time 516, the processing of INT 1 is complete, and the event logic 206 detects an event associated with the return from INT 1 processing to background processing. Responsive to detection of the event, event logic 206 generates selector control signals 216 corresponding to background processing. The selector control signals 216 cause the clock selection logic 208 to select control signals 214 assigned for background processing. That is, the selector control signals 216 cause the clock selection logic 208 to select signals assigned to clock configuration A which may be defined, for example, by the values stored in the first of the configuration registers 204 mentioned above. The clock selection logic 208 routes the control signals 214 assigned for background processing to the clock sources 210 via the clock source control signals 212, and the clock sources 210 are reconfigured using the clock source control signals 212 to provide the clock signals used for background processing in the microcontroller 110.

At 504, a second interrupt request (INT 2) is asserted. The event logic 205 detects the interrupt request and generates selector control signals 216 corresponding to assertion of INT 2. The clock signals used process INT 2 may be different from those used to process INT 1 or for background processing. The selector control signals 216 cause the clock selection logic 208 to select control signals 214 assigned for processing of INT 2. The control signals assigned for processing of INT 2 may be defined as Clock configuration C, which may be specified by the values stored in a third of the configuration registers 204. The clock selection logic 208 routes the control signals 214 assigned for processing of INT 2 to the clock sources 210 via the clock source control signals 212, and the clock sources 210 are reconfigured using the clock source control signals 212 to provide the clock signals used to process the interrupt request, INT 2.

At time 518, the processing of INT 2 is complete, and the event logic 206 detects an event associated with the return from INT 2 processing to background processing. Responsive to detection of the event, event logic 206 generates selector control signals 216 corresponding to background processing. The selector control signals 216 cause the clock selection logic 208 to select control signals 214 assigned for background processing. That is, the selector control signals 216 cause the clock selection logic 208 to select signals assigned to clock configuration A which may be defined, for example, by the values stored in the first of the configuration registers 204 mentioned above. The clock selection logic 208 routes the control signals 214 assigned for background processing to the clock sources 210 via the clock source control signals 212, and the clock sources 210 are reconfigured using the clock source control signals 212 to provide the clock signals used for background processing in the microcontroller 110.

Figure 6:
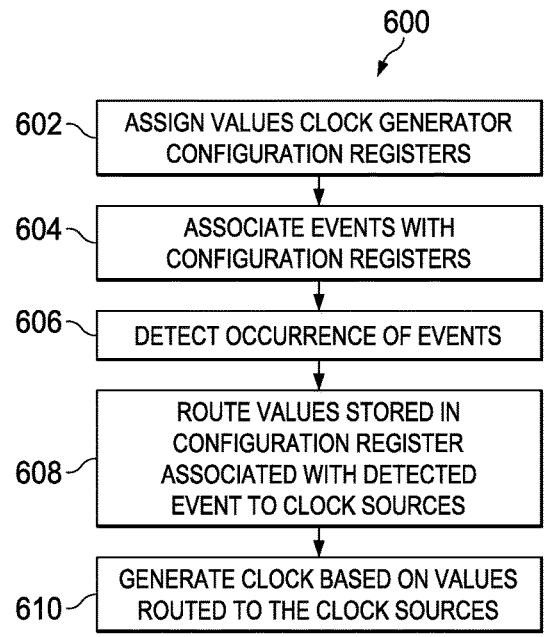
FIG. 6 shows a flow diagram for a method for event-based clock control in accordance with various embodiments.

FIG. 6 shows a flow diagram for a method 600 for event-based clock control in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented in the microcontroller 100.

In block 602, the microcontroller 100 is initializing the clock generator 102. As part of the initialization, the processor core 104 is executing instructions retrieved from the storage 106. The instructions executed by the processor core 104 in block 602, cause the processor core 104 to write values to the configuration registers 204 of the clock generator 102. Each set of values assigned to one of the configuration registers 204 corresponds to an event in the microcontroller 100, and corresponds to the configuration of the clock sources 210 needed for processing of the event (e.g., processing subsequent to the event). For example, the set of values assigned to each of the configuration registers 204 may enable or disable oscillators, set frequency division values, select clock signals, etc. in the clock sources 210.

In block 604, initialization of the clock generator 102 continues with the processor core 104 executing instructions that associate particular events with the configuration registers 204 that are assigned to provide clock configurations for the processing associated with the particular events. For example, instructions executed by the processor core 104 may cause the processor core 104 to write to registers in the event logic 206 values that define the selector control signals 216 to be generated on detection of an event at a particular input port of the event logic 206.

In block 606, the clock generator 102 has been initialized and can selectively and automatically change the configuration of the clock sources 210 based on events detected in the microcontroller 100 without intervention by the processor core 104. In block 606, the event logic 206 detects events such as assertion of interrupt requests, microcontroller mode changes (e.g., power mode changes), interrupt service returns, exceptions, microcontroller input/output terminal state changes, etc.

In block 608, responsive to detection of an event, the event logic 206 generates selector control signals 216 corresponding to the detected event. The selector control signals 216 cause the clock selection logic 208 to select control signals 214 assigned for processing of the event. That is, the selector control signals 216 cause the clock selection logic 208 to select control signals 214 output by a control register 204 assigned to the detected event. The selected control signals 214 are routed to the clock sources 210 as clock source control signals 212.

In block 610, the clock source control signals 212 reconfigure the clock sources 210 to generate the clock signals needed for processing of the detected event, and in turn the clock sources 210 generate the clock signals needed for processing of the detected event. After initialization of the configuration registers 204 and the event logic 206, changes in the configuration of the clock generator 102 are automatically performed based on detected events without further control by the processor core 104. Thus, employing embodiments of the clock generator 102 power and time associated with clock reconfiguration are reduced because no instructions are executed to reconfigure the clock generator 102.

The above discussion is meant to be illustrative of the principles and various embodiments of the present invention. Numerous variations and modifications will become apparent to those skilled in the art once the above disclosure is fully appreciated. For example, while embodiments of the clock generator 102 have been described in the context of the microcontroller 100, embodiments of the clock generator 102 are applicable to wide variety of electronic systems that change clock configuration based on events in the system. It is intended that the following claims be interpreted to embrace all such variations and modifications.

What is claimed is:

1. A system, comprising:
    a processor configured to execute instructions retrieved from memory;
    a clock generation system coupled to the processor and configured to generate a clock signal for the processor to apply to execute the instructions, the clock generation system comprising:
        a plurality of configuration registers, each of the configuration registers comprising fields to control a frequency of the clock signal;
        event association logic to receive an event signal that indicates an occurrence of an event within the system and to output a selection control signal selected from a plurality of selection control signals responsive to the receiving of the event signal indicating the occurrence of the event, wherein the event association logic includes a plurality of registers, wherein each of the plurality of registers of the event association logic stores initialization data that associates the register with a respective one of the plurality of selection control signals; and
        selection circuitry to receive the selected selection control signal and, responsive to the selected selection control signal, to associate a respective one of the configuration registers with the event occurring within the system by selecting which of the plurality of configuration registers determines the frequency of the clock signal;
    wherein the clock generation system is configured to change the frequency of the clock signal during operation of the processor, and irrespective of instructions executed by the processor, and the initialization data stored in the plurality of registers of the event association logic is provided to the event association logic by the processor;
    wherein events associated with the configuration registers include:
        an interrupt to be serviced by the processor;
        a completion of an interrupt service;
        a change in a level of a signal at an input terminal of the processor; and
        a change in a mode of the processor responsive to the processor executing an instruction; and
    wherein the plurality of selection control signals includes:
        a first selection control signal corresponding to the interrupt to be serviced by the processor;
        a second selection control signal corresponding to the completion of the interrupt service;
        a third selection control signal corresponding to the change in the level of the signal at the input terminal of the processor; and
        a fourth selection control signal corresponding to the change in the mode of the processor responsive to the processor executing the instruction.

2. The system of claim 1, wherein occurrence of the event causes the selection circuitry to change the frequency of the clock signal by changing which of the configuration registers determines the frequency of the clock signal.

3. The system of claim 1, wherein the change in the mode of the processor in response to the processor executing the instruction is a change in a power mode of the processor.

4. The system of claim 1, wherein the fields of each of the configuration registers is configured to:
    select a clock source from a plurality of clock sources to provide a clock for generation of the clock signal; and
    provide a divisor value to be applied to divide the clock for generation of the clock signal.

5. The system of claim 4, wherein the clock sources comprise a phase locked loop output, a crystal oscillator output, and an R-C oscillator output.

6. The system of claim 4, wherein the fields of each of the configuration registers are configured to selectively enable and disable each of the plurality of clock sources.

7. The system of claim 1, wherein the clock generation system includes clock source circuitry to receive information contained in the configuration register selected by the selection circuitry as clock source control signals and to generate the clock signal in response thereto, the clock source circuitry including:
- a high frequency oscillator;
- a low frequency oscillator;
- a reference oscillator;
- a phase locked loop;
- a first divider circuit having a first output; and
- a second divider circuit having a second output.

8. The system of claim 7, wherein the clock signal is one of the first output or the second output.

9. The system of claim 7, wherein the clock source control signals are supplied to each of the high frequency oscillator, the low frequency oscillator, the reference oscillator, the phase locked loop, the first divider circuit, and second divider circuit.

10. The system of claim 9, wherein the clock source circuitry includes a selector having:
- a plurality of inputs each coupled to a respective one of the high frequency oscillator, the low frequency oscillator, the reference oscillator, and the phase locked loop; and
- an output coupled in common to the first divider circuit and the second divider circuit.

11. The system of claim 10, wherein the information contained in the configuration register selected by the selection circuitry includes:
- a first field containing a first value that selectively enables or disables the high frequency oscillator;
- a second field containing a second value that selectively enables or disables the low frequency oscillator;
- a third field containing a third value that selectively enables or disables the reference oscillator;
- a fourth field containing a fourth value that selectively enables or disables the phase locked loop;
- a fifth field containing a fifth value that is supplied to the selector as a control signal to select one of the plurality of inputs of the selector to supply at the output of the selector;
- a sixth field containing a sixth value specifying a divisor for the first divider circuit; and
- a seventh field containing a seventh value specifying a divisor for the second divider circuit.

12. An electronic data processing system, comprising:
- a memory to store instructions;
- a processor to execute the instructions retrieved from the memory;
- a clock generation system coupled to the processor and configured to generate at least one clock signal for the processor to apply to execute the instructions, the clock generation system comprising:
  - a plurality of configuration registers, each of the configuration registers comprising fields to control a frequency of the at least one clock signal and each of the configuration registers being associated with a respective one of a plurality of events;
  - event association logic to receive an event signal that indicates an occurrence of one of the plurality of events within the system and, in response to the received event signal, output a selection control signal corresponding to the occurring event, the selection control signal being selected from a plurality of selection control signals;
  - selection circuitry having a plurality of inputs each coupled to a respective one of the configuration registers, wherein the selection circuitry is configured to receive the selection control signal and to select one of the configuration registers corresponding to the occurring event; and
  - clock source circuitry to receive from the selection circuitry information contained in the selected configuration register and to output the at least one clock signal having a frequency determined by the information contained in the selected configuration register;
- wherein events associated with the configuration registers include an interrupt to be serviced by the processor, a completion of an interrupt service, a change in a level of a signal at an input terminal of the processor, and a change in a mode of the processor responsive to the processor executing an instruction; and
- wherein the plurality of selection control signals includes a first selection control signal corresponding to the interrupt to be serviced by the processor, a second selection control signal corresponding to the completion of the interrupt service, a third selection control signal corresponding to the change in the level of the signal at the input terminal of the processor, and a fourth selection control signal corresponding to the change in the mode of the processor responsive to the processor executing the instruction.

13. The electronic data processing system of claim 12, wherein the event association logic includes a plurality of registers, wherein each of the plurality of registers of the event association logic stores initialization data that associates the register with a respective one of the plurality of selection control signals.

14. The electronic data processing system of claim 12, wherein the clock generation system is configured to change the frequency of the clock signal during operation of the processor and irrespective of instructions executed by the processor.

15. The electronic data processing system of claim 12, wherein the clock source circuitry includes:
- a high frequency oscillator;
- a low frequency oscillator;
- a reference oscillator;
- a phase locked loop;
- a first divider circuit having a first output; and
- a second divider circuit having a second output.

16. The electronic data processing system of claim 15, wherein the at least one clock signal includes a first clock signal and a second clock signal, the first clock signal being the first output and the second clock signal being the second output.

17. The electronic data processing system of claim 15, wherein the clock source control signals are supplied to each of the high frequency oscillator, the low frequency oscillator, the reference oscillator, the phase locked loop, the first divider circuit, and second divider circuit.

18. The electronic data processing system of claim 17, wherein the clock source circuitry includes a selector having:
- a plurality of inputs each coupled to a respective one of the high frequency oscillator, the low frequency oscillator, the reference oscillator, and the phase locked loop; and
- an output coupled in common to an input of the first divider circuit and to an input of the second divider circuit.

19. The electronic data processing system of claim 18, wherein the information contained in the configuration register selected by the selection circuitry includes:
- a first field containing a first value that selectively enables or disables the high frequency oscillator;
- a second field containing a second value that selectively enables or disables the low frequency oscillator;
- a third field containing a third value that selectively enables or disables the reference oscillator;
- a fourth field containing a fourth value that selectively enables or disables the phase locked loop;
- a fifth field containing a fifth value that is supplied to the selector as a control signal to select one of the plurality of inputs of the selector to supply at the output of the selector;
- a sixth field containing a sixth value specifying a divisor for the first divider circuit; and
- a seventh field containing a seventh value specifying a divisor for the second divider circuit.

20. The electronic data processing system of claim 12, wherein the electronic data processing system is a microcontroller.

* * * * *